Patented Nov. 13, 1923.

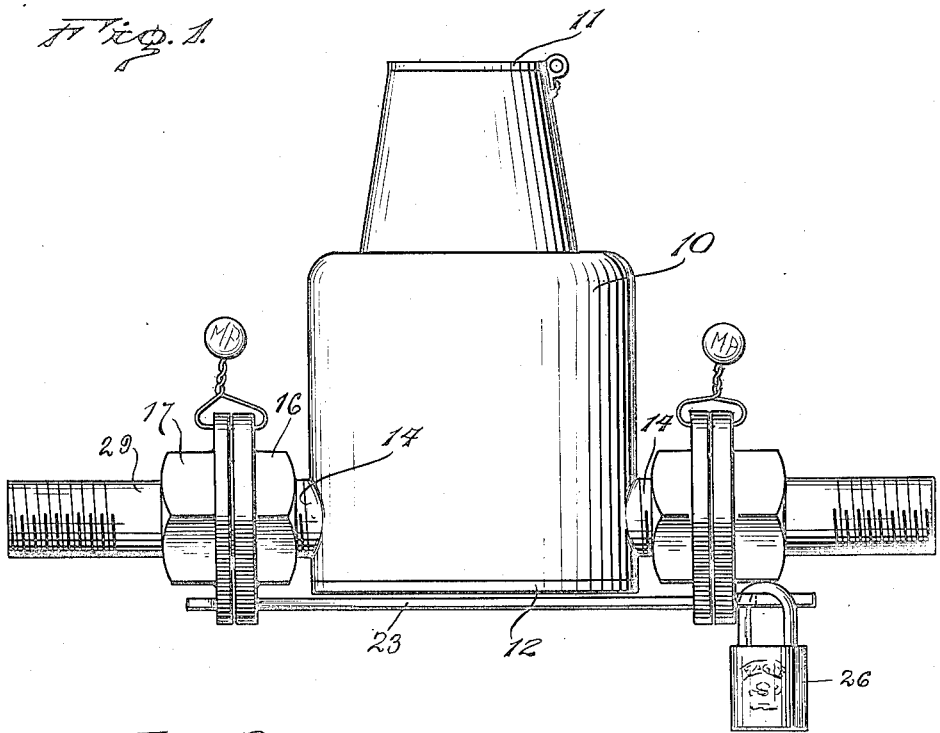
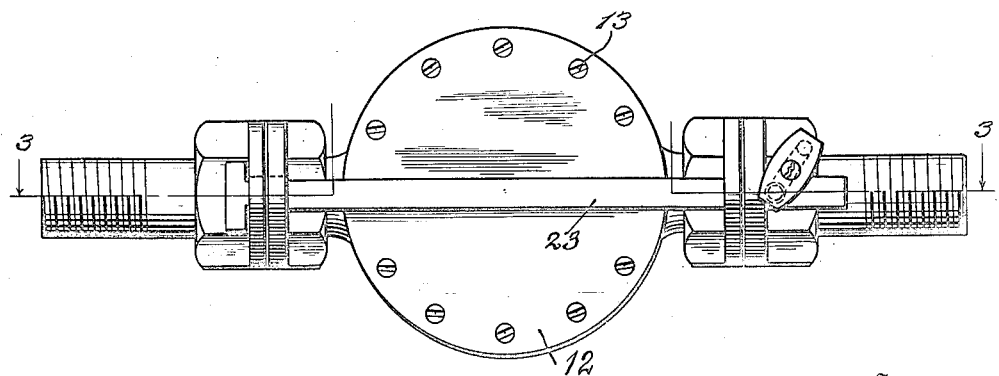

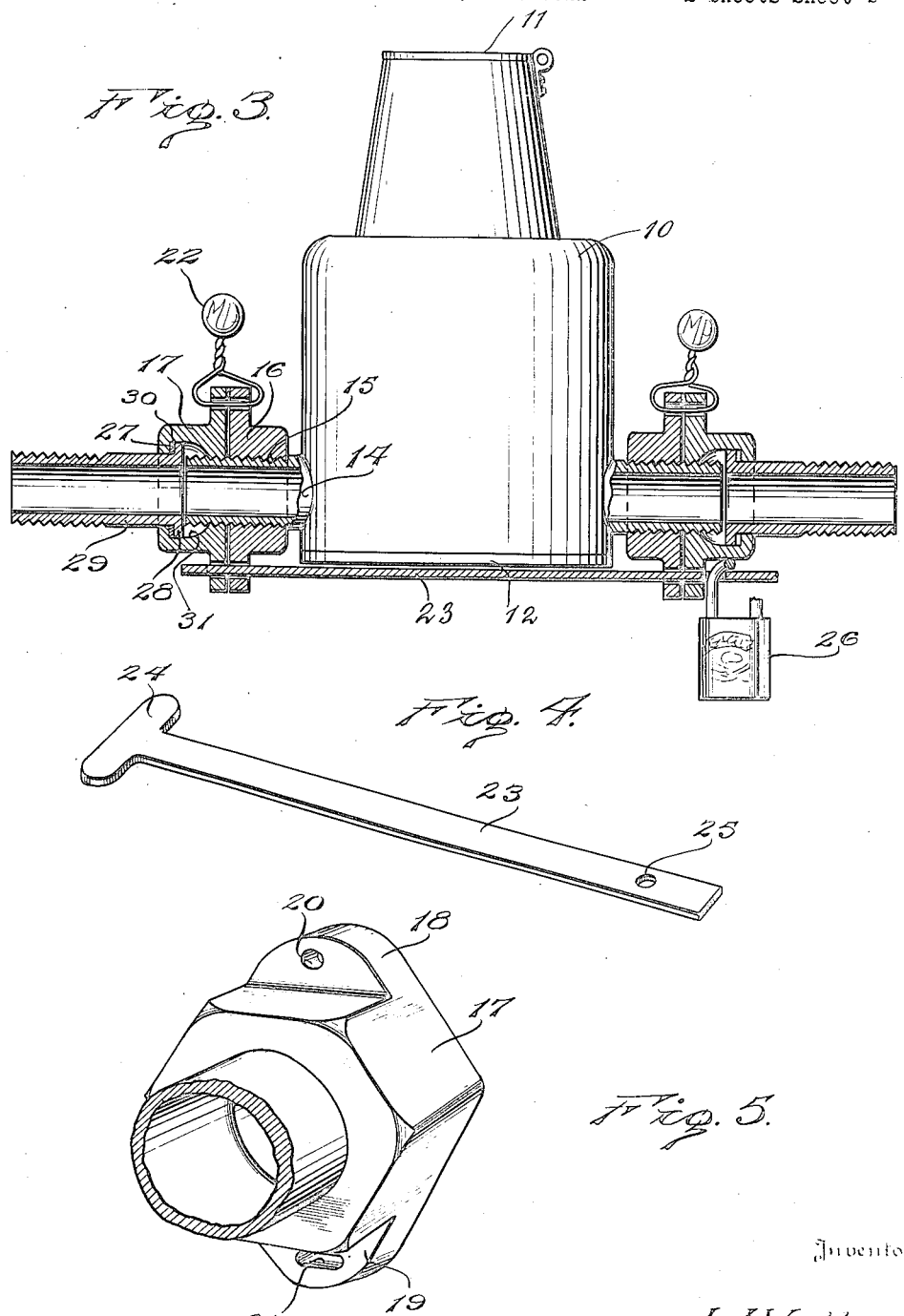

1,473,751

UNITED STATES PATENT OFFICE.

JAMES J. WALKER, OF YOUNGSTOWN, OHIO.

LOCK FOR WATER METERS.

Application filed September 5, 1922. Serial No. 586,179.

*To all whom it may concern:*

Be it known that I, JAMES J. WALKER, citizen of the United States, residing at Youngstown, in the county of Mahoning and State of Ohio, have invented certain new and useful Improvements in Locks for Water Meters, of which the following is a specification.

My invention relates to a device for locking a water meter or any other similar gauge to a supply line in such a manner, that a seal must be broken before the meter can be detached or opened.

The object of the invention is therefore to provide a safe and simple device of this character, which will guard against all tampering with the meter.

One embodiment of the invention has been illustrated in the accompanying drawings and Fig. 1 shows a side elevation of the device in position on a water meter;

Fig. 2 is a bottom plan view of Fig. 1;

Fig. 3 is a view similar to Fig. 1 showing the couplings in axial section;

Fig. 4 is a perspective view of a sealing bar and

Fig. 5 is a perspective view of a portion of a coupling.

In the drawings reference numeral 10 represents a water meter having at its top a hinged lid 11, which may be raised for reading the meter. The bottom of the meter is closed by means of a plate 12 secured in position by screws 13 or the like.

On opposite sides of the water meter are shown two tubular projections 14. These tubular projections constitute inlet and outlet ports of the meter and each is provided with external threads 15. For the purpose of connecting the meter with the supply pipe line, a coupling is furnished for each of the tubular projections, each of said couplings consists of a pair of nuts 16 and 17 having threaded engagement with a tubular projection, each of the nuts have ears 18 and 19, the former having a small aperture 20 and the latter ear 19 having a wide slot 21. The apertures 20 in the nuts 16 and 17 are adapted to register with each other when said nuts have been drawn up tightly on their tubular projections and the apertures are then ready to receive a seal 22 as seen in Fig. 3.

The extended slots 21 on the other hand are intended to receive the flat sealing bar 23 when the slots in each coupling register with each other and the two couplings are positioned with the slots in alinement as shown in Figs. 1, 2 and 3. This bar 23 has a T-head 24 at one end and a small aperture 25 at its opposite end. The distance between the T-head and the aperture has been so selected, that a pad lock 26 may be inserted in the aperture 25 and in this manner lock the two couplings together providing a seal for the water meter.

The outer nut 17 in each coupling engages by means of a flange 27, a corresponding flange 28 on the short pipe 29 intended to be inserted in the supply pipe. A packing 30 is preferably furnished between the two flanges so as to make the joint watertight. This flange 28 may be formed by spinning the inner edge of the short pipe 29 in the groove or cavity 31 formed inside of a flange 27 of nut 17. It will be evident that one or the other of the seals 22 and 23 may be dispensed with, particularly as the sealing bar 23 alone with pad lock 26 securely locks the two couplings together, so that tampering with the water meter will be impossible.

The application of the device is as follows:

The two short pipes 29 are first inserted in the supply pipe line with their flanged ends 28 at the proper distance apart to permit the placing of the water meter between them, the distances between the pipes 29 having to be slightly more than the overall length from end to end of the tubular projections 14. Before positioning the short pipes 29, the outer nut 17 must be placed upon the same, and similarly the inner nut 16 should be threaded upon the tubular projections 14. With the parts assembled in this manner the water meter is then placed between the ends of the short pipes and the outer nuts 17 drawn up upon the projections 14 until a tight connection is obtained between the flanges of said nuts and pipes, care being taken that the apertures and slots in the ears of the nuts stand in alinement with each other. The inner nuts 16 are thereupon advanced until the apertures and slots register with those in the same coupling and finally the seals 22 and 23 are inserted and the lock 26 applied.

It will be evident, that the plate 12 under the meter cannot be detached, nor can the meter itself be removed without breaking the seals, and that accordingly all tampering with the meter is prevented.

Having thus described the invention, what is claimed as new is:

1. In combination with a water meter having threaded tubular projections providing inlet and outlet openings for the meter; of couplings adapted to connect said tubular projections with a supply pipe line and means for locking said couplings; each of said couplings including a short pipe inserted in said pipe line, a flange on said short pipe, a pair of nuts having threaded engagement with said tubular projection, one of said nuts revolubly engaging said flange; said locking means comprising apertured ears on the nuts, a bar extending across the water meter and engaging in the apertures of both couplings, said bar having a T at one end and a perforation at its other end adapted to receive a padlock.

2. In combination with a water meter having threaded tubular projections providing inlet and outlet openings for the meter; of couplings adapted to connect said tubular projections with a supply pipe line and means for locking said couplings; each of said couplings including a short pipe inserted in said pipe line, a pair of nuts having threaded engagement with said tubular projection and interengaging means between said short pipe and one of said nuts; said locking means comprising apertured ears on the nuts, a bar extending across the water meter and engaging in the apertures of both couplings, said bar having a T at one end and a perforation at its other end adapted to receive a padlock.

In testimony whereof I affix my signature.

JAMES J. WALKER. [L. S.]